United States Patent [19]

Sato

[11] Patent Number: 5,257,753

[45] Date of Patent: Nov. 2, 1993

[54] FISHING REEL HAVING A ONE-PIECE INTEGRAL REEL BODY

[75] Inventor: Jun Sato, Osaka, Japan

[73] Assignee: Shimano, Inc., Osaka, Japan

[21] Appl. No.: 750,283

[22] Filed: Aug. 27, 1991

[30] Foreign Application Priority Data

Aug. 28, 1990 [JP] Japan ................ 2-227340

[51] Int. Cl.⁵ .................................... A01K 89/00
[52] U.S. Cl. ............................................. 242/310
[58] Field of Search ............. 242/310, 312, 313, 314, 242/315, 316

[56] References Cited

PUBLICATIONS

Daiwa 1987 Product Catalog.

*Primary Examiner*—Joseph J. Hail, III
*Attorney, Agent, or Firm*—Dickstein, Shapiro & Morin

[57] ABSTRACT

A reel body is manufactured by casting a light metal to form one side case and a center frame integrally. The center frame includes a connector for connecting the other side case opposed to the one side case, and annular collars disposed opposite and close to outer peripheries of side walls defining a line accommodating section of a spool. The annular collars have an opening diameter smaller than an inside diameter of an interior space of the one side case. The interior space is formed by using a core removable through an extract opening defined in a peripheral wall of the one side case.

5 Claims, 6 Drawing Sheets

FISHING REEL HAVING A ONE-PIECE INTEGRAL REEL BODY

BACKGROUND OF THE INVENTION

1. Field of the Invention

This invention relates to a method of manufacturing reel bodies, and reel bodies manufactured by this method. More particularly, the invention relates to a method of manufacturing reel bodies for baitcasting use and having an outside diameter about 45 to 70 mm. Such a reel body includes first side case and a center frame formed integrally by casting. The center frame includes a connector for connecting the second side case opposed to the one side case, and annular collars disposed opposite and close to outer peripheries of side walls defining a line accommodating section of a spool. The annular collars have an opening diameter smaller than an inside diameter of an interior space of the one side case.

2. Description of the Related Art

The above fishing reel with first side case and the center frame formed integrally has the following basic characteristics.

Where the first side case and center frame are interconnected by screws or by caulking, the connection becomes loose after a long period of use with repeated bait casting action. This results in the inconvenience of the annular collars contacting side walls of the spool, or the annular collars forming increased gaps with the side walls of the spool to allow the fishing line to fall off.

On the other hand, where the first side case and center frame are formed integrally as noted above, little or no change occurs in the union between the first side case and center frame even if bait casting action is repeated several hundred times a day. This provides the advantage of positively avoiding the contact between the annular collars and the side walls of the spool.

In the above reel body, the one side case has a large interior space in order to accommodate various components with ease and also to achieve light weight by means of a reduced wall thickness. Consequently, this interior space has a greater inside diameter than an opening diameter of the annular collars, the latter being dependent on an outside diameter of the spool.

To increase the inside diameter of the interior space of the first side case, a manufacturing method such as by casting is employed in which a core is inserted through a connection end of the center frame. First, the interior space is formed to have an inside diameter corresponding to the opening diameter of the annular collars. Subsequently, a boring tool is inserted through the connection end of the center frame to enlarge the inside diameter by cutting.

However, a long cutting time is needed to enlarge the inside diameter by means of the boring tool, and hence a low manufacturing efficiency.

SUMMARY OF THE INVENTION

The object of the present invention is to provide a method of manufacturing a reel body having the advantage obtained from integration of first side case and center frame while improving the manufacturing efficiency, and a reel body having such advantage.

The above object is fulfilled, according to the present invention, by a manufacturing method in which the interior space of first side case is formed by using a core removable through an extract opening defined in a peripheral wall of the one side case. A reel body according to the present invention is manufactured by this method.

Since the core for forming the interior space of the first side case is removable through a peripheral wall of the first side case, the interior space may be formed to have an inside diameter greater than the opening diameter of the annular collars when the reel body is formed by casting.

Consequently, no cutting process is required to reduce the wall thickness.

Although a finishing process is needed for the interior space, the manufacturing time is shortened by elimination of the cutting process for reducing the wall thickness.

Moreover, the extract opening for removing the core is defined in a peripheral wall of the side case away from the connection between the side case and center frame. This imparts no influence on the connection between the side case and center frame, thereby retaining the advantage obtained from the integration.

Other features and advantages of the invention will be apparent from the following description.

BRIEF DESCRIPTION OF THE DRAWINGS

The drawings show a method of manufacturing reel bodies according to the present invention and a reel body manufactured by this method, in which.

DETAILED DESCRIPTION OF THE PREFERRED EMBODIMENTS

Figure 1:
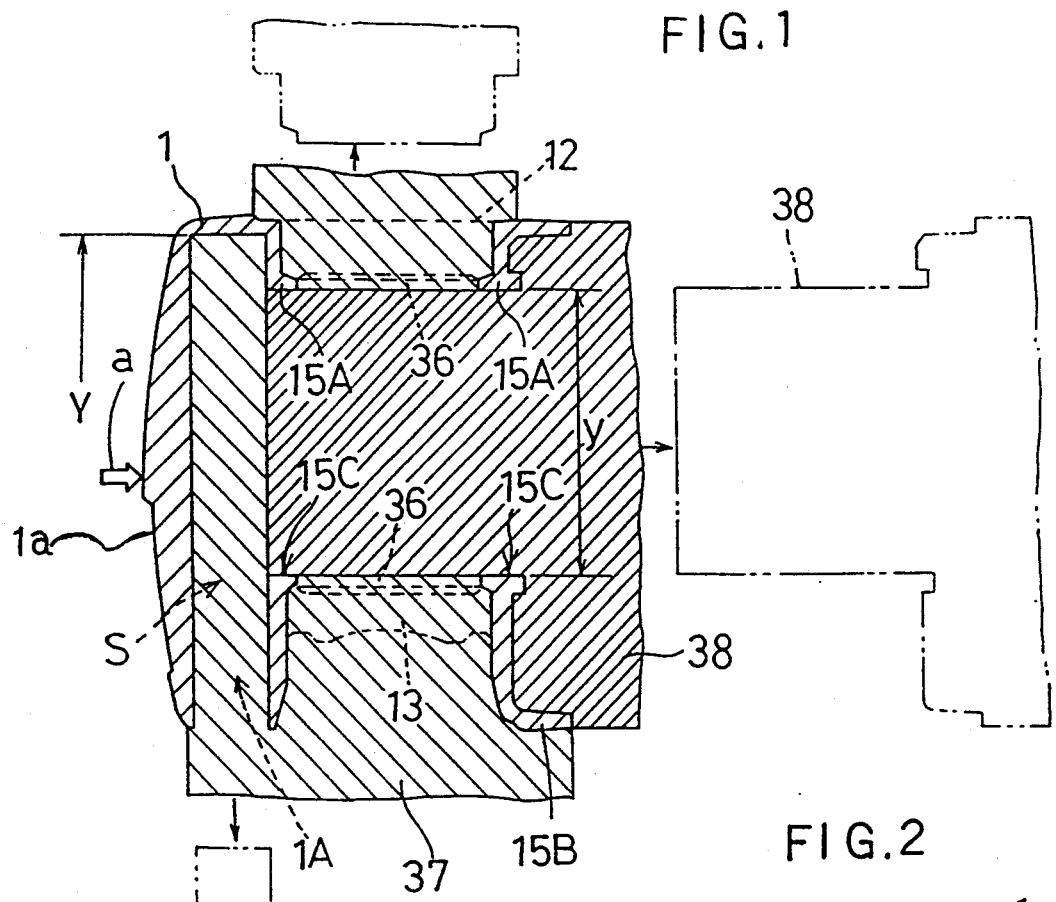
FIG. 1 is a side view in vertical section showing a reel body in a casting process.

A method of manufacturing reel bodies according to the present invention, and a reel body manufactured by this method will be described in detail with reference to the drawings.

FIGS. 5 through 10 show a two-bearing reel for baitcasting. The reel comprises a reel body having two side cases, i.e. a left case 1 and a right case 2. The reel has a level wind mechanism R mounted in a front position thereof and including a screw shaft 3, a guide rod 4 and a line guide 5. Further, the reel has a spool 6 mounted centrally thereof and a clutch controller 7 mounted in a rear position. The right case 2 supports a handle 8, a drag controller 9, a cast controller 10 and a brake controller 11.

In this reel, the left case 1, a thumb rest 12 between the left case I and right case 2, a pair of lower frames 13, and a center frame 15 connected to the right case 2 are formed into an integral reel body A by aluminum die casting. The right case 2 is attached to the reel body A.

Figure 7:
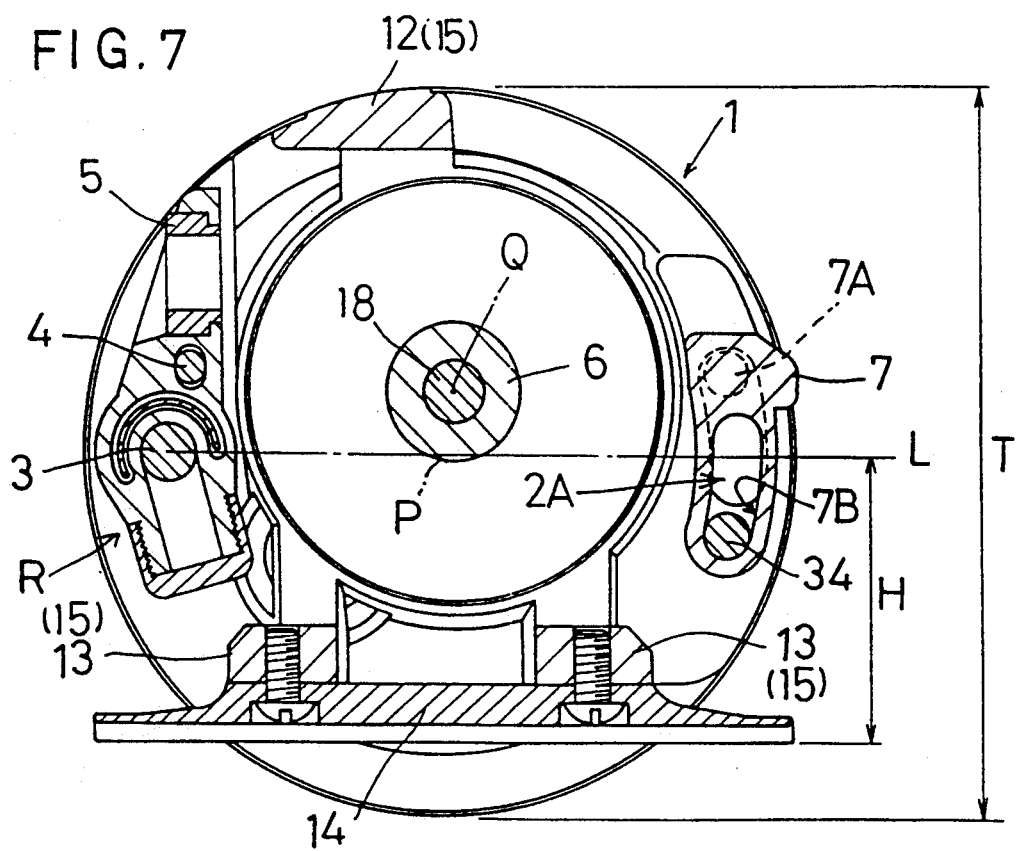
FIG. 7 is a side view in vertical section of the reel.

As shown in FIG. 7, the reel body A has a circular configuration in side view. The spool 6 has an axis Q offset a predetermined amount upward from the center F) of the circular configuration. The screw shaft 3 is disposed on a horizontal plane L level with the center P.

A mounting foot 14 is disposed between the pair of lower frames 13 for attaching the reel to a rod. The foot 14 has a vertical distance H not exceeding 40 mm from the center P, with the reel body having an outside diameter T within a range of 45 to 70 mm.

Figure 5:
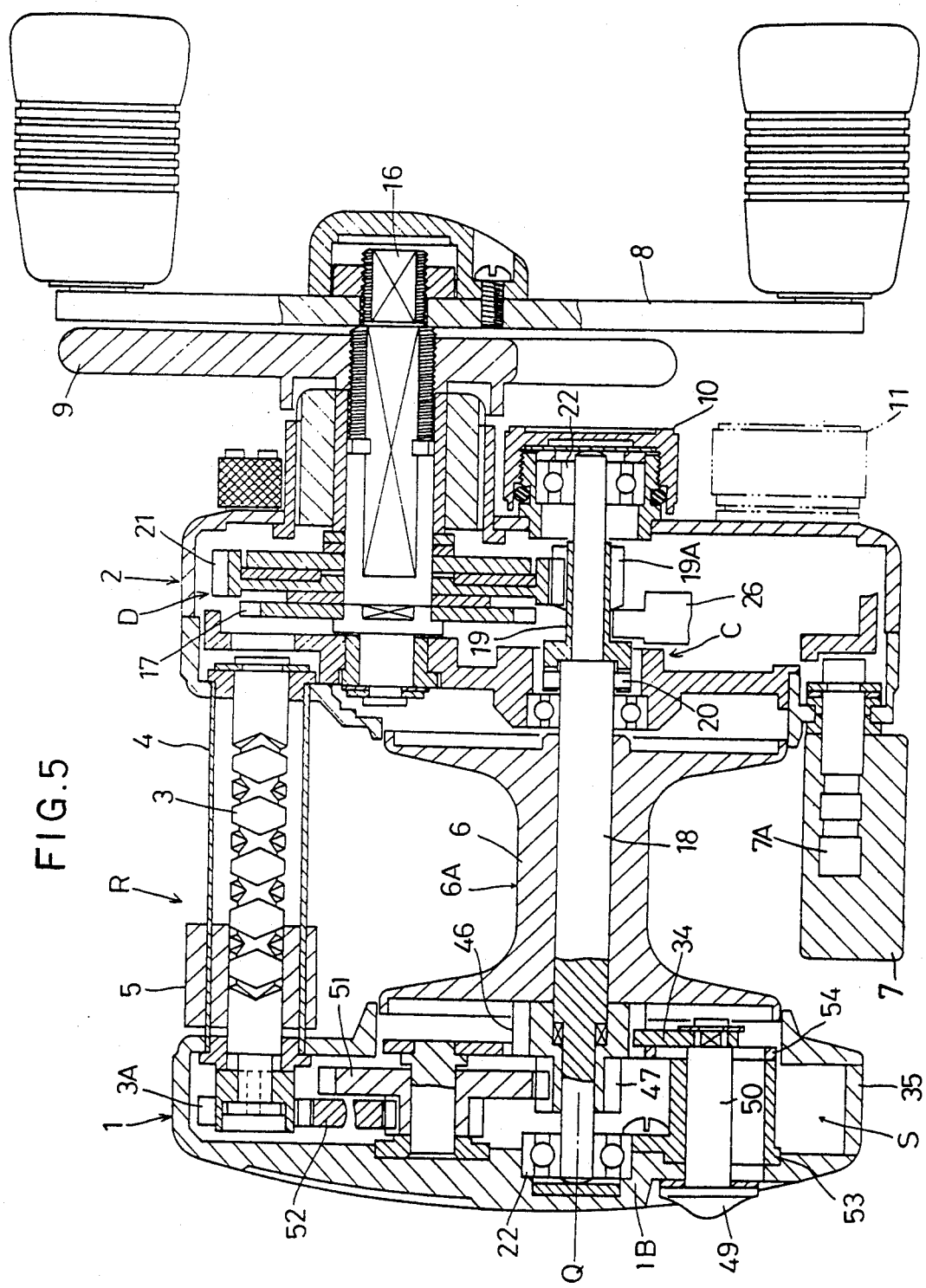
FIG. 5 is a cross section of the reel body.
Figure 6:
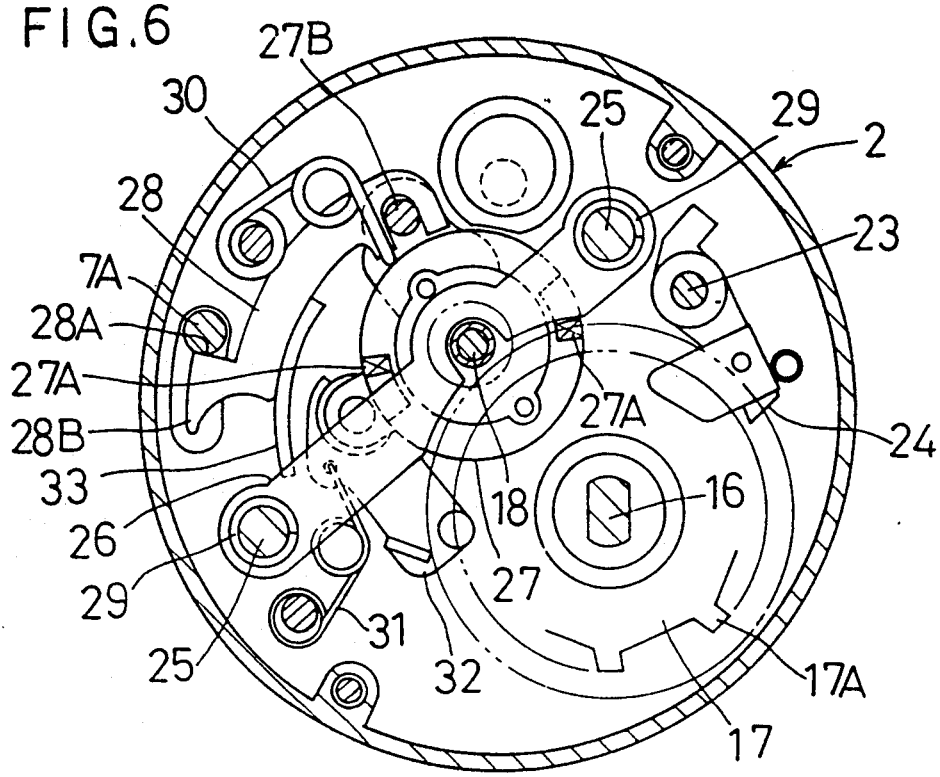
FIG. 6 is a side view showing a transmission system mounted in a left side case.

As shown in FIGS. 5 and 6, the handle 8 and drag controller 9 are mounted on a handle shaft 16 extending from the right case 2. The handle shaft 16 supports a drag mechanism D and a ratchet wheel 17 mounted on an inward end portion thereof. A spool shaft 18 rotatable with the spool 6 supports a clutch sleeve 19 slidably mounted thereon and a pin 20 fixed to the spool shaft 18 to be engageable with the clutch sleeve 19. The clutch sleeve 19 and pin 20 constitute a clutch mechanism C. The clutch sleeve 19 has an input gear 19A meshed with an output gear 21 of the drag mechanism D, whereby torque from the handle 8 is transmitted to the spool 6 through the drag mechanism D and clutch mechanism C.

The spool shaft 18 is supported at opposite ends thereof by bearings 22. The cast controller 10 is screwed to the right case 2 for adjusting a frictional force applied to the righthand end of the spool shaft 18. The ratchet wheel 17 has teeth 17A engageable with a ratchet pawl 24 pivotable on an axis 23 to prevent backward turning of the handle 8.

As shown in FIG. 6, the clutch sleeve 19 is engaged with a shifter 26 slidably supported on a pair of support shafts 25. A rotary cam 27 is rotatably mounted coaxially with the axis Q of the spool 6. This rotary cam 27 defines a pair of cam surfaces 27A for sliding the shifter 26. The rotary cam 27 has an engaging pin 27B engaged with a link element 28 operable through contact with a control pin 7A of the clutch controller 7.

Compression springs 29 are mounted on the support shafts 25 to urge the shifter 26 and clutch mechanism C to a clutch engaging position. A toggle spring 30 acts on the rotary cam 27 to maintain the rotary cam 27 in a position to engage or a position to disengage the clutch mechanism C. A further toggle spring 31 acts on a return arm 32 to switch the arm 32 to a position in which an end thereof interferes with the ratchet wheel 17 when the clutch mechanism C is set to the disengaged position. When disengaging the clutch mechanism C, the clutch controller 7 is depressed to place the link element 28 into contact with a guide 33. Then the link element 28 moves describing an arcuate locus while in contact with the guide 33, to rotate the rotary cam 27. As a result, the clutch mechanism C is disengaged through pressure contact with the cam surfaces 27A. When engaging the clutch mechanism C, the handle 8 is turned in a direction to take up the fishing line. This causes a tooth 17A of the ratchet wheel 17 to push the return arm 32, whereby the rotary cam 27 is returned. Consequently, the shifter 26 moves under the urging force of compression springs 29 to the position to engage the clutch mechanism C.

Figure 10:
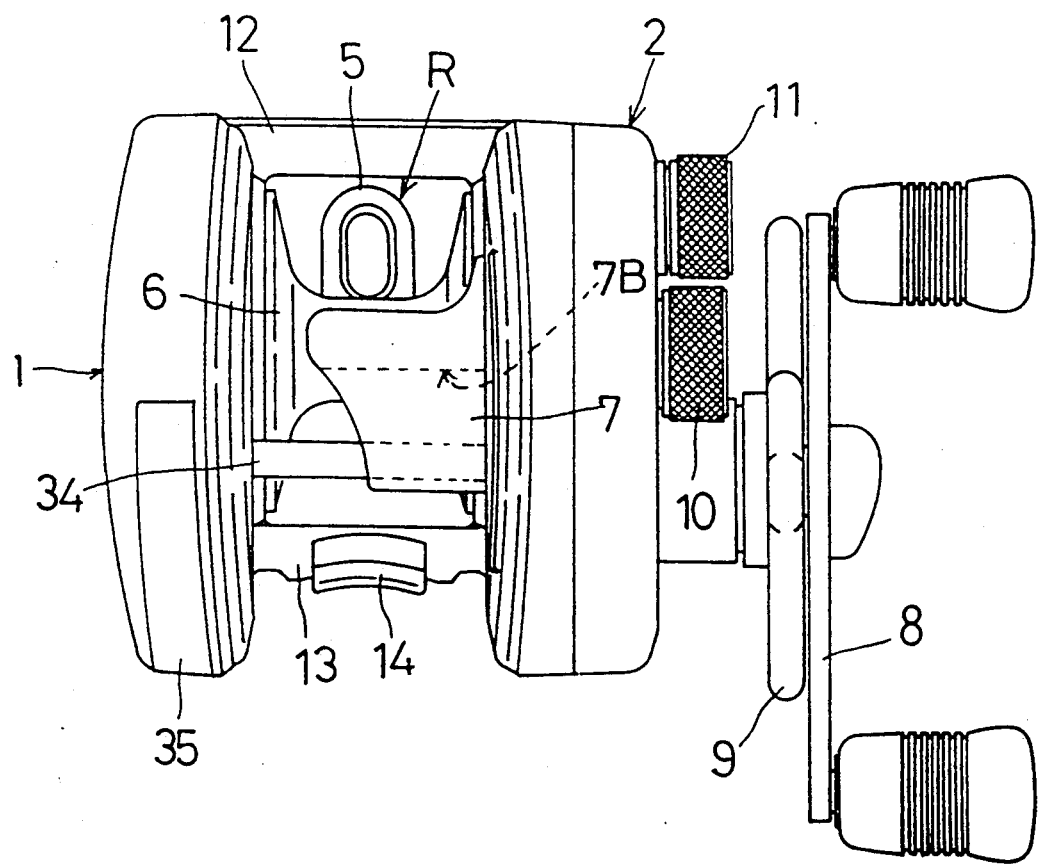
FIG. 10 is a front view of the reel.

As shown in FIGS. 7 and 10, the clutch controller 7 is supported to be slidable only relative to the right case 2. The control pin 7A extends through an arcuate guide bore 2A so that the clutch controller 7 describes an arcuate locus about the center P of the reel body in side view. The clutch controller 7 defines an arcuate perforation 7B to receive a connecting frame 34.

It is necessary, when assembling the reel, to insert the control pin 7A into the guide bore 2A in such a way that the pin 7A is correctly placed above an engaging portion 28A of the link element 28. To facilitate this operation, the link element 28 includes a restricting projection 28B formed at a lower end thereof to stop insertion of the pin 7A to a position below the link element 28.

As shown in FIGS. 5 and 10, the right case 2 has a magnet type brake mechanism mounted therein, whose braking force is adjustable by the brake controller 11.

Figure 8:
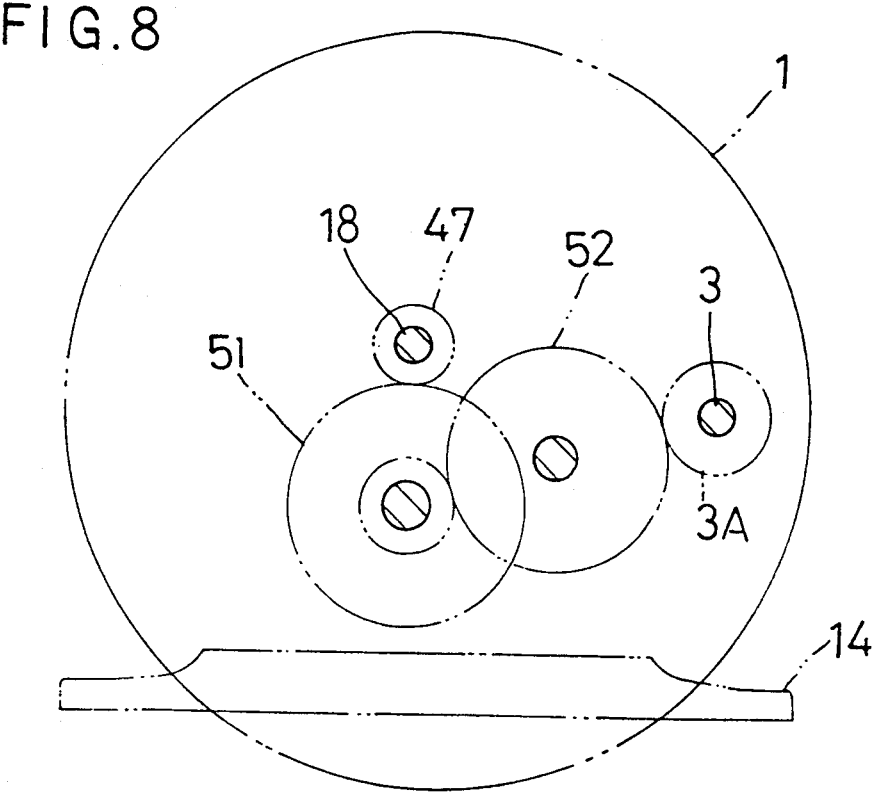
FIG. 8 is a side view showing a transmission system for a level wind mechanism in a right side case.
Figure 9:
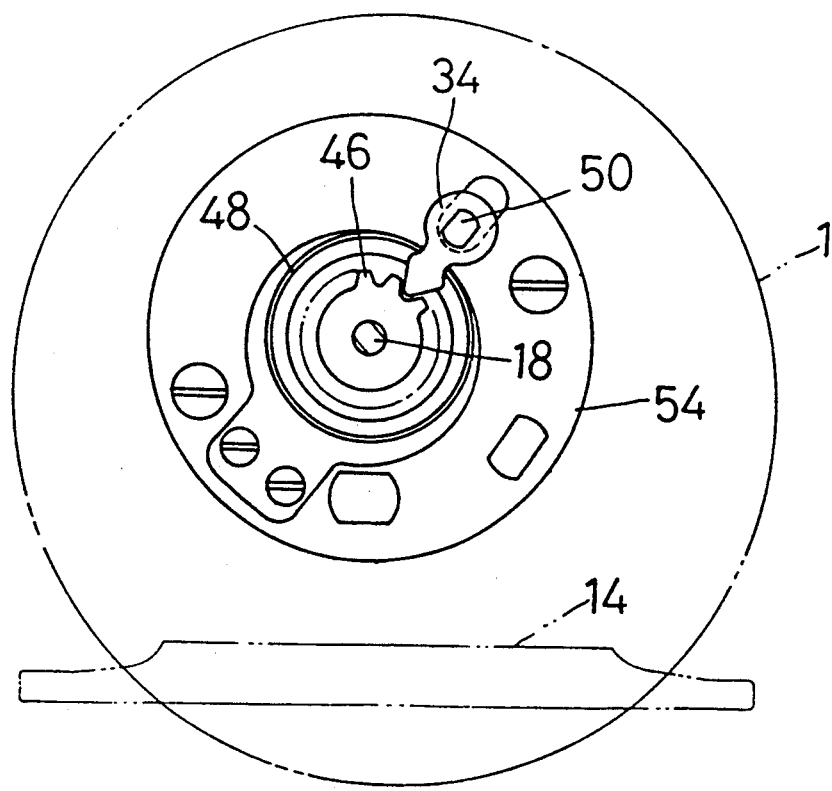
FIG. 9 is a side view showing a sound producing piece.

As shown in FIGS. 5 and 9, the spool shaft 18 carries, fixed to a left end region thereof extending into the left case 1, an element having a first gear 46 for producing a clicking sound and a second gear 47 for transmitting drive to the level wind mechanism R. A clicking piece 51 is disposed adjacent the first gear 46, which is urged by a ring spring 48 defining a slit and is movable by a control knob 49 and a control shaft 50 into and oat of engagement with the first gear 46. Further, as shown in FIG. 8, a transmission system is provided which includes a first and a second intermediate gears 51 and 52 for transmitting the drive from the second gear 47 to an input gear 3A mounted on the screw shaft 3. The transmission system and clicking system are mounted in the left case 1 and supported by two plates 53 and 54, respectively.

Figure 2:
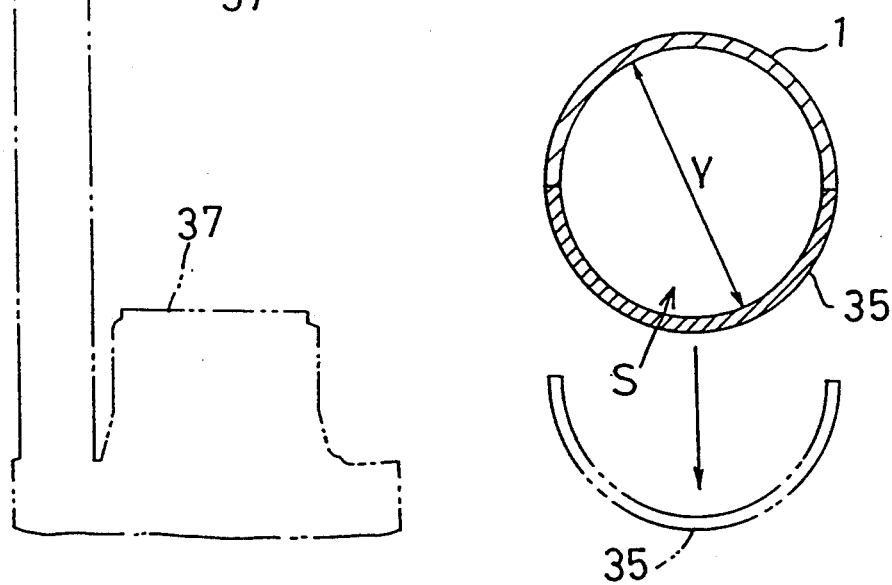
FIG. 2 is a side view in vertical section showing the way in which a lid is mounted to cover an interior space.

The left case 1 defines an extract opening 1A in a lower position on the circular outer periphery thereof communicating with its interior space S. This opening 1A is used for insertion and removal of an interior space forming core 37 described later. A lid 35 is provided to close the opening 1A as shown in FIGS. 2 and 3.

Figure 3:
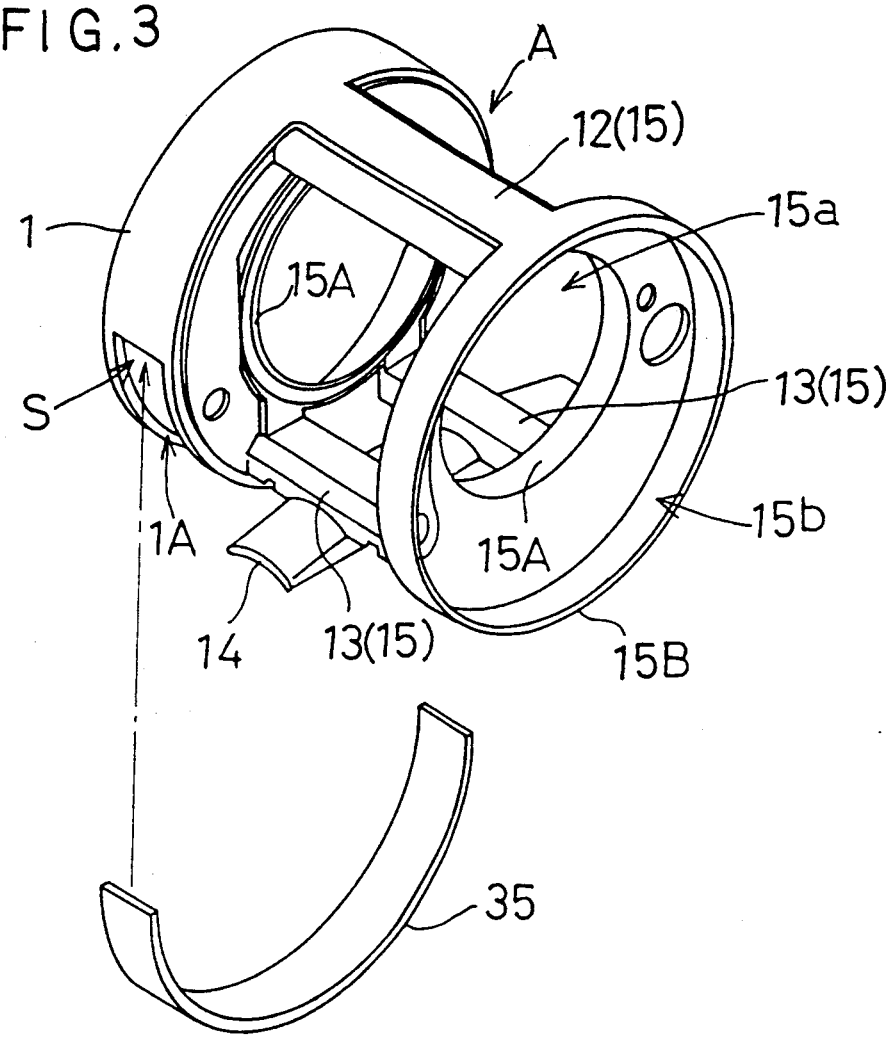
FIG. 3 is a perspective view of the reel body.

As shown in FIG. 3, the center frame 15 includes a pair of right and left annular collars 15A formed on inside peripheral walls thereof. These annular collars 15A have inside walls thereof defining spool-inserting opening 15a in close proximity to opposite side walls of the spool 6 defining a line accommodating section 6A. This construction prevents the fishing line from slipping out of the line accommodating section 6A. The center frame 15 further includes a flange-like connector 15B rightwardly of the right annular collar 15A for connection to the right case 2. The connector 15B defines an opening 15b.

A manufacturing process will be described next.

Figure 4:
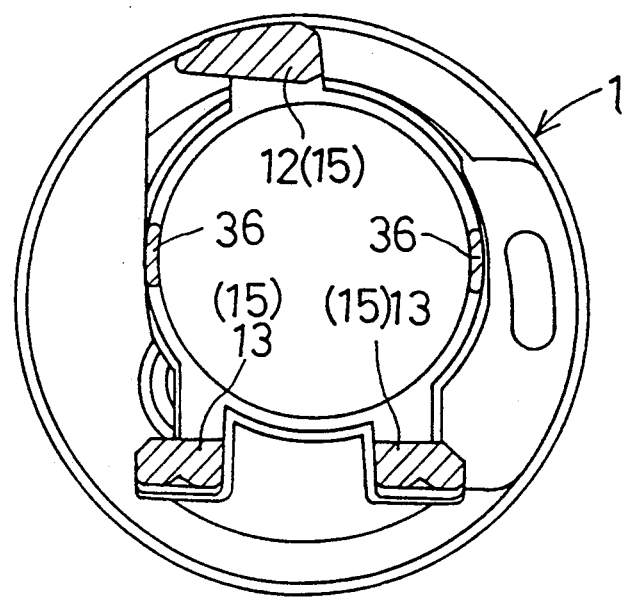
FIG. 4 is a side view in vertical section of the reel body with an auxiliary frame attached thereto.

(A) As shown in FIGS. 1 and 3, the left case 1 and center frame 15 are formed integrally by die casting a light metal such as aluminum. The flange-like connector 15B and left case 1 are interconnected only by the thumb rest 12 and two lower frames 13 which are narrow and thin. Therefore, when molten aluminum is injected through gates a in FIG. 1, the melt does not have good fluidity in passages of small cross-sectional areas corresponding to the thumb rest and other components. Thus, as shown in FIGS. 1 and 4, two auxiliary frames 36 are placed to extend between the left and right annular collars 15A to secure a smooth supply of melt from the left case 1 to the flange connector 15B. These auxiliary frames 36 are removed in a cutting step.

(B) As shown in FIG. 1, the core 37 used to form the interior space S of the left case 1 is removed through the extract opening 1A of the left case 1 after the die casting. This interior space forming core 37 are used also as a die for forming the annular collars 15A. The spool-inserting opening 15a of the annular collars 15A are formed by using a collar forming core 38 inserted through the opening 15b of the connector 15B. This core 38 is removed thereafter.

As a result, the interior space S has an inside diameter Y larger than an inside diameter y of the spool-inserting opening 15a of the annular collars 15A. FIG. 1 shows only those portions of the cores 37 and 38 necessary for the die casting.

(C) After the die casting, outside and inside peripheral surfaces of the reel body A are cut. Then, a finishing step is carried out on walls of the spool-inserting opening 15a of the annular collars 15A, bearing holders 1B for receiving the spool shaft supporting bearings 22, and the interior space S. Outer surfaces are also smoothed in the finishing step.

Further, round surfaces are formed on lateral edges of the thumb rest 12 and center frame 15 continuous therewith, to check formation of burs on the lateral edges when the thumb rest is finished by cutting.

(D) Inside walls 15C of the annular collars 15A are difficult to cut, and are therefore subjected to a shot peening or vibrating barrel treatment to remove burs.

(E) The finished reel body A is put to an appropriate surface treatment such as an alumite treatment to give brightness to the reel body A.

The above method may be modified as follows:

(1) The reel body A may be formed of zinc, magnesium or other material similar in castability to aluminum. The configuration of the reel body A may be selected as desired according to specifications.

(2) The reel body A may include the right frame 2 and center frame 15.

(3) The extract opening 1A is not limited to the location shown in FIG. 1 but may be formed in a lateral wall of the left case 1.

What is claimed is:

1. A reel body comprising:
 a second side case;
 a center frame including a connector for connecting said second side case and first and second openings for inserting a spool, each said opening having an aperture diameter;
 a first side case including an outer side face, an outer periphery defining an extract opening and an interior space having an inner diameter larger than said aperture diameter of said first opening;
 annular collars formed around said first and second openings respectively, and
 a lid for closing said extract opening;
 wherein said first side case and said center frame are forged integral with each other, and wherein a core forming said interior space is withdrawable through said extract opening of said first side case.

2. A reel body as claimed in claim 1, wherein said reel body has a circular configuration with an outside diameter in a range of 45 to 70 mm.

3. A reel body as claimed in claim 1, wherein said center frame includes said annular collars at right and left positions on the inside walls of said center frame.

4. A reel body as claimed in claim 1, wherein said extract opening extends substantially over a half peripheral portion of said outer periphery of said first side case.

5. A reel body as claimed in claim 1, wherein the surfaces of said reel body and said second side case respectively are alumite-treated.

* * * * *